United States Patent [19]

Saegusa

[11] Patent Number: 5,757,851
[45] Date of Patent: May 26, 1998

[54] COMMUNICATION RECEIVER USING SOFT DECISION TCH/FACCH CHANNEL DISCRIMINATOR

[75] Inventor: Yasuhiro Saegusa, Tokyo, Japan

[73] Assignee: NEC Corporation, Tokyo, Japan

[21] Appl. No.: 796,497

[22] Filed: Feb. 6, 1997

Related U.S. Application Data

[63] Continuation of Ser. No. 329,852, Oct. 27, 1994, abandoned.

[30] Foreign Application Priority Data

Oct. 27, 1993 [JP] Japan ................................. 5-269206

[51] Int. Cl.$^6$ ........................................................ H03D 1/00
[52] U.S. Cl. ........................ 375/229; 375/316; 340/825.03
[58] Field of Search ................................. 375/316, 317, 375/340, 342, 343, 229; 340/825.03; 395/85; 331/173; 371/43, 45, 38.1; 455/464; 370/465, 437

[56] References Cited

U.S. PATENT DOCUMENTS

| | | | |
|---|---|---|---|
| 4,797,947 | 1/1989 | Labedz | 375/216 |
| 5,155,742 | 10/1992 | Ariyavistakul et al. | 375/231 |
| 5,199,031 | 3/1993 | Dahlin | 370/110.1 |
| 5,271,042 | 12/1993 | Borth et al. | 375/341 |
| 5,335,356 | 8/1994 | Anderson | 455/54.1 |
| 5,341,401 | 8/1994 | Farjh et al. | 375/341 |

OTHER PUBLICATIONS

Sampei, "Development of Japanese ... Land Mobile Communications" IEICE Transactions vol. E74 No. 6 Jun. 1991.
European Digital Cellular Telecommunications System (phase 1); Channel coding (GSM 05.03), European Telecommunications Standards Institute., Mar. 1991.

*Primary Examiner*—Wellington Chin
*Assistant Examiner*—William Luther
*Attorney, Agent, or Firm*—Foley & Lardner

[57] ABSTRACT

In a digital cellular communication system, a cell-site station transmits a frame containing a fixed number of burst signals each having stealing flag bits indicating that the frame is a traffic channel (TCH) or a fast associated control channel (FACCH). A mobile station receives delay-dispersed burst signals and equalizes their delay-dispersal effects to produce soft information so that each of the transmitted stealing flag bit is represented by a multibit value. A channel discriminator provides a total sum of all the multibit values of the received burst signals and compares the sum to a threshold value to identify the received frame as a FACCH if the sum is equal to or greater than the threshold value, or identify it as a TCH if the sum is smaller than the threshold value.

6 Claims, 19 Drawing Sheets

| THRESHOLD | TCH | | FACCH | | \|A − B\| |
|---|---|---|---|---|---|
| | % | A | % | B | |
| 1 | 11.8 % | 236 | 100.0 % | 1,999 | 1,763 |
| 2 | 38.9 % | 778 | 99.9 % | 1,998 | 1,220 |
| 3 | 69.0 % | 1,379 | 99.4 % | 1,988 | 609 |
| 4 | 89.0 % | 1,379 | 97.1 % | 1,941 | 142 |
| * 5 | 97.4 % | 1,948 | 89.3 % | 1,786 | 162 |
| 6 | 99.6 % | 1,991 | 69.9 % | 1,397 | 594 |
| 7 | 100.0 % | 1,999 | 40.3 % | 805 | 1,194 |
| 8 | 100.0 % | 1,999 | 11.7 % | 233 | 1,766 |

LEGEND: A = NO. OF DETECTED TCH FRAMES
B = NO. OF DETECTED FACCH FRAMES

| THRESHOLD | TCH | | FACCH | | \|A − B\| |
|---|---|---|---|---|---|
| | % | A | % | B | |
| 1 | 12.7 % | 254 | 100.0 % | 1,999 | 1,745 |
| 2 | 40.4 % | 807 | 99.9 % | 1,998 | 1,191 |
| 3 | 70.4 % | 1,40 | 99.7 % | 1,993 | 585 |
| 4 | 90.7 % | 1,813 | 98.4 % | 1,967 | 154 |
| * 5 | 97.7 % | 1,954 | 92.0 % | 1,839 | 115 |
| 6 | 99.6 % | 1,992 | 76.2 % | 1,523 | 469 |
| 7 | 100.0 % | 1,999 | 46.7 % | 933 | 1,066 |
| 8 | 100.0 % | 1,999 | 15.1 % | 301 | 1,698 |

| THRESHOLD | TCH | | FACCH | | |A – B| |
|---|---|---|---|---|---|
| | % | A | % | B | |
| 1 | 18.9 % | 378 | 100.0 % | 1,999 | 1,621 |
| 2 | 53.4 % | 1,068 | 100.0 % | 1,998 | 931 |
| 3 | 81.7 % | 1,634 | 99.9 % | 1,998 | 364 |
| * 4 | 95.5 % | 1,910 | 99.2 % | 1,983 | 73 |
| 5 | 99.2 % | 1,983 | 94.1 % | 1,882 | 101 |
| 6 | 99.9 % | 1,998 | 81.6 % | 1,632 | 366 |
| 7 | 100.0 % | 1,999 | 54.8 % | 1,096 | 903 |
| 8 | 100.0 % | 1,999 | 19.3 % | 386 | 1,613 |

LEGEND: A = NO. OF DETECTED TCH FRAMES
B = NO. OF DETECTED FACCH FRAMES

| THRESHOLD | TCH | | FACCH | | |A – B| |
|---|---|---|---|---|---|
| | % | A | % | B | |
| 1 | 24.9 % | 498 | 100.0 % | 1,999 | 1,501 |
| 2 | 62.5 % | 1,249 | 100.0 % | 1,999 | 750 |
| 3 | 87.4 % | 1,748 | 100.0 % | 1,999 | 251 |
| * 4 | 90.7 % | 1,951 | 99.7 % | 1,993 | 42 |
| 5 | 99.5 % | 1,989 | 96.5 % | 1,930 | 59 |
| 6 | 100.0 % | 1,999 | 86.9 % | 1,738 | 261 |
| 7 | 100.0 % | 1,999 | 63.0 % | 1,259 | 740 |
| 8 | 100.0 % | 1,999 | 24.7 % | 493 | 1,506 |

FIG. 2E
PRIOR ART
S/N = -2 dB

| THRESHOLD | TCH | | FACCH | | \|A-B\| |
|---|---|---|---|---|---|
| | % | A | % | B | |
| 1 | 32.0 % | 639 | 100.0 % | 1,999 | 1,360 |
| 2 | 71.9 % | 1,438 | 100.0 % | 1,999 | 561 |
| 3 | 92.5 % | 1,850 | 100.0 % | 1,999 | 149 |
| 4 | 98.8 % | 1,976 | 99.9 % | 1,998 | 22 |
| * 5 | 99.8 % | 1,996 | 99.8 % | 1,995 | 1 |
| 6 | 100.0 % | 1,999 | 97.9 % | 1,958 | 41 |
| 7 | 100.0 % | 1,999 | 86.6 % | 1,731 | 268 |
| 8 | 100.0 % | 1,999 | 52.2 % | 1,043 | 956 |

LEGEND: A = NO. OF DETECTED TCH FRAMES
B = NO. OF DETECTED FACCH FRAMES

FIG. 2F
PRIOR ART
S/N = -1 dB

| THRESHOLD | TCH | | FACCH | | \|A-B\| |
|---|---|---|---|---|---|
| | % | A | % | B | |
| 1 | 41.0 % | 819 | 100.0 % | 1,999 | 1,180 |
| 2 | 80.2 % | 1,604 | 100.0 % | 1,999 | 395 |
| 3 | 95.5 % | 1,910 | 100.0 % | 1,999 | 89 |
| 4 | 99.3 % | 1,985 | 99.9 % | 1,997 | 12 |
| * 5 | 99.8 % | 1,996 | 99.4 % | 1,987 | 9 |
| 6 | 100.0 % | 1,999 | 95.6 % | 1,911 | 88 |
| 7 | 100.0 % | 1,999 | 79.3 % | 1,586 | 413 |
| 8 | 100.0 % | 1,999 | 41.3 % | 825 | 1,174 |

| THRESHOLD | TCH | | FACCH | | \|A − B\| |
|---|---|---|---|---|---|
| | % | A | % | B | |
| 1 | 52.4 % | 1,048 | 100.0 % | 1,999 | 951 |
| 2 | 87.4 % | 1,747 | 100.0 % | 1,999 | 252 |
| 3 | 98.0 % | 1,960 | 100.0 % | 1,999 | 39 |
| 4 | 99.7 % | 1,994 | 99.9 % | 1,998 | 4 |
| * 5 | 99.9 % | 1,998 | 99.8 % | 1,995 | 3 |
| 6 | 100.0 % | 1,999 | 97.9 % | 1,958 | 14 |
| 7 | 100.0 % | 1,999 | 86.6 % | 1,731 | 268 |
| 8 | 100.0 % | 1,999 | 52.2 % | 1,043 | 956 |

LEGEND: A = NO. OF DETECTED TCH FRAMES
B = NO. OF DETECTED FACCH FRAMES

LEGEND: A = NO. OF DETECTED TCH FRAMES
B = NO. OF DETECTED FACCH FRAMES

| THRESHOLD | TCH % | A | FACCH % | B | IA − BI |
|---|---|---|---|---|---|
| 7 | 13.9 % | 278 | 100.0 % | 1,999 | 1,721 |
| 14 | 48.4 % | 967 | 99.9 % | 1,998 | 1,031 |
| 21 | 80.8 % | 1,616 | 99.7 % | 1,993 | 377 |
| 22 | 84.6 % | 1,692 | 99.4 % | 1,988 | 296 |
| 23 | 87.4 % | 1,747 | 99.0 % | 1,980 | 233 |
| 24 | 90.3 % | 1,806 | 98.6 % | 1,971 | 165 |
| 25 | 92.2 % | 1,844 | 98.2 % | 1,963 | 119 |
| 26 | 93.6 % | 1,871 | 97.6 % | 1,952 | 81 |
| 27 | 95.1 % | 1,901 | 97.2 % | 1,944 | 43 |
| * 28 | 96.2 % | 1,924 | 96.3 % | 1,926 | 2 |
| 29 | 97.2 % | 1,943 | 95.1 % | 1,901 | 42 |
| 30 | 97.7 % | 1,953 | 93.6 % | 1,872 | 81 |
| 31 | 98.3 % | 1,965 | 92.2 % | 1,843 | 122 |
| 32 | 98.8 % | 1,976 | 90.3 % | 1,805 | 171 |
| 33 | 99.1 % | 1,982 | 88.3 % | 1,766 | 216 |
| 34 | 99.3 % | 1,986 | 86.5 % | 1,730 | 256 |
| 35 | 99.6 % | 1,991 | 84.1 % | 1,681 | 310 |
| 36 | 99.7 % | 1,994 | 81.2 % | 1,623 | 371 |
| 37 | 99.7 % | 1,994 | 77.9 % | 1,557 | 437 |
| 38 | 99.8 % | 1,996 | 73.7 % | 1,474 | 522 |
| 39 | 99.9 % | 1,997 | 68.3 % | 1,366 | 631 |
| 40 | 99.9 % | 1,998 | 63.8 % | 1,276 | 722 |
| 41 | 100.0 % | 1,999 | 59.4 % | 1,188 | 811 |
| 42 | 100.0 % | 1,999 | 54.6 % | 1,091 | 908 |
| 49 | 100.0 % | 1,999 | 18.3 % | 365 | 1,634 |
| 56 | 100.0 % | 1,999 | 1.1 % | 21 | 1,978 |

FIG. 7B
S/N = −5 dB

LEGEND: A = NO. OF DETECTED TCH FRAMES
B = NO. OF DETECTED FACCH FRAMES

| THRESHOLD | TCH | | FACCH | | |A − B| |
| --- | --- | --- | --- | --- | --- |
| | % | A | % | B | |
| 7  | 14.6 % | 292   | 100.0 % | 1,999 | 1,707 |
| 14 | 49.9 % | 998   | 99.9 %  | 1,998 | 1,000 |
| 21 | 82.4 % | 1,648 | 99.8 %  | 1,996 | 348   |
| 22 | 85.8 % | 1,715 | 99.8 %  | 1,995 | 280   |
| 23 | 88.5 % | 1,769 | 99.6 %  | 1,992 | 223   |
| 24 | 91.2 % | 1,823 | 99.4 %  | 1,987 | 164   |
| 25 | 93.0 % | 1,860 | 99.0 %  | 1,980 | 120   |
| 26 | 94.4 % | 1,887 | 98.9 %  | 1,977 | 90    |
| 27 | 95.9 % | 1,917 | 98.5 %  | 1,970 | 53    |
| 28 | 96.6 % | 1,932 | 98.1 %  | 1,961 | 29    |
| * 29 | 97.4 % | 1,947 | 97.2 % | 1,944 | 3     |
| 30 | 98.2 % | 1,963 | 96.2 %  | 1,923 | 40    |
| 31 | 98.7 % | 1,974 | 95.1 %  | 1,901 | 73    |
| 32 | 98.9 % | 1,977 | 93.7 %  | 1,874 | 103   |
| 33 | 99.2 % | 1,984 | 92.2 %  | 1,843 | 141   |
| 34 | 99.4 % | 1,988 | 90.6 %  | 1,811 | 177   |
| 35 | 99.6 % | 1,992 | 87.9 %  | 1,758 | 234   |
| 36 | 99.8 % | 1,996 | 84.9 %  | 1,698 | 298   |
| 37 | 99.9 % | 1,997 | 82.4 %  | 1,648 | 349   |
| 38 | 99.9 % | 1,997 | 80.1 %  | 1,601 | 396   |
| 39 | 99.9 % | 1,997 | 75.9 %  | 1,518 | 479   |
| 40 | 99.9 % | 1,998 | 71.2 %  | 1,424 | 574   |
| 41 | 100.0 % | 1,999 | 66.7 % | 1,334 | 665   |
| 42 | 100.0 % | 1,999 | 61.7 % | 1,233 | 766   |
| 49 | 100.0 % | 1,999 | 23.0 % | 460   | 1,539 |
| 56 | 100.0 % | 1,999 | 1.2 %  | 23    | 1,976 |

LEGEND: A = NO. OF DETECTED TCH FRAMES
B = NO. OF DETECTED FACCH FRAMES

| THRESHOLD | TCH % | TCH A | FACCH % | FACCH B | IA − BI |
|---|---|---|---|---|---|
| 7 | 20.7 % | 413 | 100.0 % | 1,999 | 1,586 |
| 14 | 63.5 % | 1,269 | 100.0 % | 1,999 | 730 |
| 21 | 91.0 % | 1,820 | 99.9 % | 1,997 | 177 |
| 22 | 93.4 % | 1,867 | 99.9 % | 1,997 | 130 |
| 23 | 97.0 % | 1,904 | 99.8 % | 1,996 | 92 |
| 24 | 96.4 % | 1,928 | 99.7 % | 1,994 | 66 |
| 25 | 97.1 % | 1,942 | 99.7 % | 1,994 | 52 |
| 26 | 97.9 % | 1,957 | 99.5 % | 1,990 | 33 |
| 27 | 98.5 % | 1,970 | 99.3 % | 1,985 | 15 |
| * 28 | 90.0 % | 1,980 | 98.9 % | 1,977 | 3 |
| 29 | 99.2 % | 1,984 | 98.5 % | 1,970 | 14 |
| 30 | 99.5 % | 1,990 | 97.9 % | 1,957 | 33 |
| 31 | 99.7 % | 1,993 | 97.2 % | 1,943 | 50 |
| 32 | 99.8 % | 1,995 | 96.5 % | 1,929 | 66 |
| 33 | 99.8 % | 1,996 | 95.2 % | 1,903 | 93 |
| 34 | 99.9 % | 1,998 | 93.8 % | 1,876 | 122 |
| 35 | 99.9 % | 1,998 | 92.1 % | 1,841 | 157 |
| 36 | 99.9 % | 1,998 | 90.3 % | 1,806 | 192 |
| 37 | 99.9 % | 1,998 | 87.7 % | 1,753 | 245 |
| 38 | 100.0 % | 1,999 | 84.5 % | 1,690 | 309 |
| 39 | 100.0 % | 1,999 | 81.5 % | 1,630 | 369 |
| 40 | 100.0 % | 1,999 | 78.5 % | 1,570 | 429 |
| 41 | 100.0 % | 1,999 | 74.3 % | 1,485 | 514 |
| 42 | 100.0 % | 1,999 | 68.5 % | 1,369 | 630 |
| 49 | 100.0 % | 1,999 | 21.4 % | 568 | 1,431 |
| 56 | 100.0 % | 1,999 | 1.3 % | 25 | 1,974 |

FIG. 7D
S/N = -3 dB

LEGEND: A = NO. OF DETECTED TCH FRAMES
B = NO. OF DETECTED FACCH FRAMES

| THRESHOLD | TCH | | FACCH | | IA - BI |
|---|---|---|---|---|---|
| | % | A | % | B | |
| 7 | 26.2 % | 524 | 100.0 % | 1,999 | 1,475 |
| 14 | 71.2 % | 1,424 | 100.0 % | 1,999 | 575 |
| 21 | 95.0 % | 1,899 | 100.0 % | 1,999 | 100 |
| 22 | 96.3 % | 1,926 | 99.9 % | 1,998 | 72 |
| 23 | 97.1 % | 1,941 | 99.9 % | 1,997 | 56 |
| 24 | 98.2 % | 1,964 | 99.9 % | 1,997 | 33 |
| 25 | 98.6 % | 1,971 | 99.9 % | 1,997 | 26 |
| 26 | 99.1 % | 1,982 | 99.8 % | 1,995 | 13 |
| 27 | 99.4 % | 1,987 | 99.7 % | 1,994 | 7 |
| * 28 | 99.6 % | 1,991 | 99.6 % | 1,992 | 1 |
| 29 | 99.6 % | 1,992 | 99.4 % | 1,988 | 4 |
| 30 | 99.8 % | 1,995 | 99.1 % | 1,981 | 14 |
| 31 | 99.8 % | 1,996 | 98.6 % | 1,971 | 25 |
| 32 | 99.9 % | 1,997 | 98.0 % | 1,959 | 38 |
| 33 | 99.9 % | 1,998 | 97.5 % | 1,950 | 48 |
| 34 | 99.9 % | 1,998 | 96.8 % | 1,936 | 62 |
| 35 | 100.0 % | 1,999 | 95.8 % | 1,915 | 84 |
| 36 | 100.0 % | 1,999 | 94.2 % | 1,883 | 116 |
| 37 | 100.0 % | 1,999 | 92.1 % | 1,841 | 158 |
| 38 | 100.0 % | 1,999 | 89.3 % | 1,785 | 214 |
| 39 | 100.0 % | 1,999 | 86.7 % | 1,733 | 266 |
| 40 | 100.0 % | 1,999 | 83.9 % | 1,678 | 321 |
| 41 | 100.0 % | 1,999 | 80.8 % | 1,615 | 384 |
| 42 | 100.0 % | 1,999 | 76.7 % | 1,534 | 465 |
| 49 | 100.0 % | 1,999 | 34.4 % | 687 | 1,312 |
| 56 | 100.0 % | 1,999 | 1.4 % | 28 | 1,971 |

FIG. 7E
S/N = −2 dB

LEGEND: A = NO. OF DETECTED TCH FRAMES
B = NO. OF DETECTED FACCH FRAMES

| THRESHOLD | TCH % | A | FACCH % | B | \|A − B\| |
|---|---|---|---|---|---|
| 7 | 33.2 % | 664 | 100.0 % | 1,999 | 1,335 |
| 14 | 79.3 % | 1,586 | 100.0 % | 1,999 | 413 |
| 21 | 97.4 % | 1,948 | 100.0 % | 1,999 | 51 |
| 22 | 98.4 % | 1,967 | 100.0 % | 1,998 | 32 |
| 23 | 99.0 % | 1,979 | 100.0 % | 1,997 | 20 |
| 24 | 99.4 % | 1,987 | 100.0 % | 1,997 | 12 |
| 25 | 99.5 % | 1,990 | 99.9 % | 1,997 | 8 |
| 26 | 99.6 % | 1,991 | 99.9 % | 1,995 | 7 |
| 27 | 99.7 % | 1,993 | 99.9 % | 1,994 | 5 |
| * 28 | 99.7 % | 1,994 | 99.8 % | 1,992 | 3 |
| * 29 | 99.9 % | 1,998 | 99.4 % | 1,988 | 3 |
| 30 | 99.9 % | 1,998 | 99.6 % | 1,992 | 6 |
| 31 | 99.9 % | 1,999 | 99.4 % | 1,987 | 11 |
| 32 | 100.0 % | 1,999 | 99.2 % | 1,984 | 15 |
| 33 | 100.0 % | 1,999 | 98.8 % | 1,976 | 23 |
| 34 | 100.0 % | 1,999 | 98.3 % | 1,965 | 34 |
| 35 | 100.0 % | 1,999 | 97.7 % | 1,953 | 46 |
| 36 | 100.0 % | 1,999 | 96.7 % | 1,933 | 66 |
| 37 | 100.0 % | 1,999 | 96.1 % | 1,921 | 78 |
| 38 | 100.0 % | 1,999 | 94.5 % | 1,889 | 110 |
| 39 | 100.0 % | 1,999 | 91.9 % | 1,838 | 161 |
| 40 | 100.0 % | 1,999 | 89.5 % | 1,789 | 210 |
| 41 | 100.0 % | 1,999 | 86.5 % | 1,730 | 269 |
| 42 | 100.0 % | 1,999 | 83.3 % | 1,666 | 333 |
| 49 | 100.0 % | 1,999 | 41.0 % | 819 | 1,180 |
| 56 | 100.0 % | 1,999 | 1.9 % | 37 | 1,962 |

FIG. 7F
S/N = -1 dB

LEGEND: A = NO. OF DETECTED TCH FRAMES
B = NO. OF DETECTED FACCH FRAMES

| THRESHOLD | TCH | | FACCH | | |A - B| |
|---|---|---|---|---|---|
| | % | A | % | B | |
| 7 | 40.4 % | 808 | 100.0 % | 1,999 | 1,191 |
| 14 | 86.1 % | 1,721 | 100.0 % | 1,999 | 278 |
| 21 | 99.0 % | 1,979 | 100.0 % | 1,999 | 20 |
| 22 | 99.4 % | 1,987 | 100.0 % | 1,999 | 12 |
| 23 | 99.5 % | 1,989 | 100.0 % | 1,999 | 10 |
| 24 | 99.7 % | 1,993 | 100.0 % | 1,999 | 6 |
| 25 | 99.8 % | 1,996 | 100.0 % | 1,999 | 3 |
| 26 | 99.9 % | 1,998 | 100.0 % | 1,999 | 1 |
| * 27 | 100.0 % | 1,999 | 100.0 % | 1,999 | 0 |
| * 28 | 100.0 % | 1,999 | 100.0 % | 1,999 | 0 |
| 29 | 100.0 % | 1,999 | 99.9 % | 1,998 | 1 |
| 30 | 100.0 % | 1,999 | 99.9 % | 1,998 | 1 |
| 31 | 100.0 % | 1,999 | 99.8 % | 1,996 | 3 |
| 32 | 100.0 % | 1,999 | 99.7 % | 1,994 | 5 |
| 33 | 100.0 % | 1,999 | 99.4 % | 1,988 | 11 |
| 34 | 100.0 % | 1,999 | 99.4 % | 1,987 | 12 |
| 35 | 100.0 % | 1,999 | 99.0 % | 1,979 | 20 |
| 36 | 100.0 % | 1,999 | 98.6 % | 1,972 | 27 |
| 37 | 100.0 % | 1,999 | 98.0 % | 1,959 | 40 |
| 38 | 100.0 % | 1,999 | 97.2 % | 1,944 | 55 |
| 39 | 100.0 % | 1,999 | 95.8 % | 1,916 | 83 |
| 40 | 100.0 % | 1,999 | 94.3 % | 1,885 | 114 |
| 41 | 100.0 % | 1,999 | 92.2 % | 1,844 | 155 |
| 42 | 100.0 % | 1,999 | 89.2 % | 1,783 | 216 |
| 49 | 100.0 % | 1,999 | 48.6 % | 972 | 1,027 |
| 56 | 100.0 % | 1,999 | 2.5 % | 49 | 1,950 |

FIG. 7G
S/N = 0 dB

LEGEND: A = NO. OF DETECTED TCH FRAMES
B = NO. OF DETECTED FACCH FRAMES

| THRESHOLD | TCH | | FACCH | | \|A − B\| |
|---|---|---|---|---|---|
| | % | A | % | B | |
| 7 | 49.0 % | 980 | 100.0 % | 1,999 | 1,019 |
| 14 | 92.2 % | 1,844 | 100.0 % | 1,999 | 155 |
| 21 | 99.5 % | 1,990 | 100.0 % | 1,999 | 9 |
| 22 | 99.7 % | 1,993 | 100.0 % | 1,999 | 6 |
| 23 | 99.9 % | 1,998 | 100.0 % | 1,999 | 1 |
| 24 | 99.9 % | 1,998 | 100.0 % | 1,999 | 1 |
| 25 | 99.9 % | 1,998 | 100.0 % | 1,999 | 1 |
| 26 | 99.9 % | 1,998 | 100.0 % | 1,999 | 1 |
| * 27 | 100.0 % | 1,999 | 100.0 % | 1,999 | 0 |
| * 28 | 100.0 % | 1,999 | 100.0 % | 1,999 | 0 |
| * 29 | 100.0 % | 1,999 | 100.0 % | 1,999 | 0 |
| * 30 | 100.0 % | 1,999 | 100.0 % | 1,999 | 0 |
| * 31 | 100.0 % | 1,999 | 100.0 % | 1,999 | 0 |
| 32 | 100.0 % | 1,999 | 99.7 % | 1,998 | 1 |
| 33 | 100.0 % | 1,999 | 99.4 % | 1,998 | 1 |
| 34 | 100.0 % | 1,999 | 99.4 % | 1,996 | 3 |
| 35 | 100.0 % | 1,999 | 99.0 % | 1,993 | 6 |
| 36 | 100.0 % | 1,999 | 98.6 % | 1,989 | 10 |
| 37 | 100.0 % | 1,999 | 98.0 % | 1,982 | 17 |
| 38 | 100.0 % | 1,999 | 97.2 % | 1,972 | 27 |
| 39 | 100.0 % | 1,999 | 95.8 % | 1,956 | 43 |
| 40 | 100.0 % | 1,999 | 94.3 % | 1,941 | 58 |
| 41 | 100.0 % | 1,999 | 92.2 % | 1,919 | 80 |
| 42 | 100.0 % | 1,999 | 94.1 % | 1,882 | 117 |
| 49 | 100.0 % | 1,999 | 57.2 % | 1,143 | 856 |
| 56 | 100.0 % | 1,999 | 3.1 % | 61 | 1,938 |

FIG. 8

| S/N (dB) | INVENTION | | | | | | | PRIOR ART | | | | | |
|---|---|---|---|---|---|---|---|---|---|---|---|---|---|
| | THRES-HOLD | TCH | | FACCH | | \|A-B\| | THRES-HOLD | TCH | | FACCH | | \|A-B\| |
| | | % | A | % | B | | | % | A | % | B | |
| -6 | 28 | 96.2% | 1,924 | 96.3% | 1,926 | 2 | 4 | 89.0% | 1,799 | 97.1% | 1,941 | 142 |
| -5 | 29 | 97.4% | 1,947 | 97.2% | 1,944 | 3 | 5 | 97.7% | 1,954 | 92.0% | 1,839 | 115 |
| -4 | 28 | 99.0% | 1,980 | 98.9% | 1,977 | 3 | 4 | 95.5% | 1,910 | 99.2% | 1,983 | 73 |
| -3 | 28 | 99.6% | 1,991 | 99.6% | 1,992 | 1 | 4 | 97.6% | 1,951 | 99.7% | 1,993 | 42 |
| -2 | 28 | 99.7% | 1,994 | 99.9% | 1,997 | 3 | 5 | 99.8% | 1,996 | 99.8% | 1,995 | 1 |
| -2 | 29 | 99.9% | 1,998 | 99.8% | 1,995 | 0 | | | | | | |
| -1 | 27 | 100.0% | 1,999 | 100.0% | 1,999 | 0 | 5 | 99.8% | 1,996 | 99.4% | 1,987 | 9 |
| -1 | 28 | 100.0% | 1,999 | 100.0% | 1,999 | 0 | | | | | | |
| 0 | 27 | 100.0% | 1,999 | 100.0% | 1,999 | | 5 | 99.8% | 1,998 | 99.8% | 1,995 | 3 |
| 0 | 28 | 100.0% | 1,999 | 100.0% | 1,999 | | | | | | | |
| 0 | 29 | 100.0% | 1,999 | 100.0% | 1,999 | | | | | | | |
| 0 | 30 | 100.0% | 1,999 | 100.0% | 1,999 | | | | | | | |

LEGEND: A = NUMBER OF DETECTED TCH FRAMES
B = NUMBER OF DETECTED FACCH FRAMES

COMMUNICATION RECEIVER USING SOFT DECISION TCH/FACCH CHANNEL DISCRIMINATOR

This application is a continuation of application Ser. No. 08/329,852, filed Oct. 27, 1994, now abandoned.

BACKGROUND OF THE INVENTION

1. Field of the Invention

The present invention relates generally to digital cellular communications systems, and more specifically to a channel discrimination technique particularly for use in the European digital cellular telecommunications system (Groupe Special Mobile).

2. Description of the Related Art

In the current GSM digital cellular communication system, speech and data bits from a cell-site base station are carried on a traffic channel (TCH) frame, and control bits are on carried on a fast associated control channel (FACCH) frame which is created by "stealing" part or whole bits of a TCH frame. To enable mobile stations to discriminate between TCH and FACCH frames, stealing flag bits are inserted in predetermined bit positions of each burst of the FACCH frame. On receiving a frame, each mobile station initiates an equalizing process to account for delay-dispersal effects of the transmission path to produce a single bit sequence, and counts the stealing flag bits of the frame contained in the bit sequence. The mobile station then compares the number of stealing flag bits of the frame to a hard decision threshold and determines that the frame is a FACCH if that number is equal to or greater than the threshold; otherwise it determines that the frame is a TCH. Since the equalized signal is of a sequence of bits of single significance each and hence the channel discrimination is based on hard decision comparison, there is a need to increase the resolution of the stealing flag bit count to permit the setting of the threshold to a more precise value.

SUMMARY OF THE INVENTION

It is therefore an object of the present invention to provide an improved channel discrimination technique for a communication system by increasing the resolution of stealing flag bit count by representing each symbol bit with a plurality of bits of different significances.

According to the present invention, a channel discrimination between a traffic channel frame and a fast associated control channel frame is made by (a) receiving a frame containing a fixed number of delay-dispersed burst signals, each burst signal containing information bits and/or control bits, and at least one stealing flag bit indicating the presence or absence of the control bits, (b) equalizing delay-dispersal effects of the burst signals and producing therefrom soft information representing the stealing flag bit of each burst signal by a multibit value, (c) summing all the multibit values of all the burst signals of the received frame to produce a count value, and (d) comparing the count value to a threshold value to determine that the received frame is the fast associated control channel if the count value is equal to or greater than the threshold value and that the received frame is the traffic channel if the count value is smaller than the threshold value. As a result, the resolution of the count value is increased and soft decision is made for precision discrimination of each frame.

BRIEF DESCRIPTION OF THE DRAWINGS

The present invention will be described in further detail with reference to the accompanying drawings, in which:

FIGS. 2A to 2G are tables showing computer simulations conducted under different qualities of signal to evaluate the prior art hard decision decoding;

FIGS. 7A to 7G are tables showing computer simulations conducted under different qualities of signal to evaluate the soft decision decoding of the present invention; and FIG. 8 is a comparison table summarizing the best threshold values of the prior art and those of the present invention.

DETAILED DESCRIPTION

Figure 1:
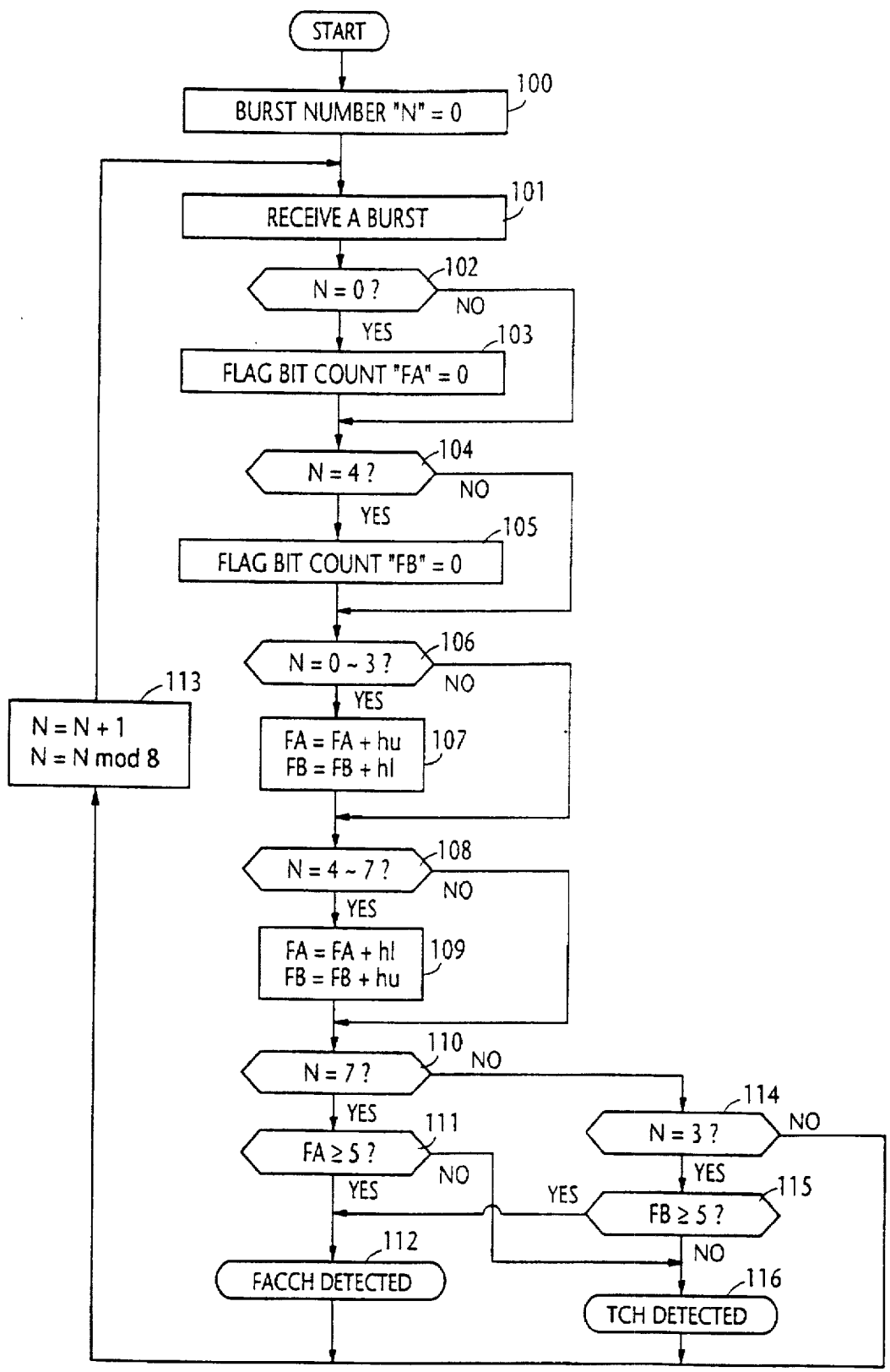
FIG. 1 is a flowchart of a prior art channel discrimination process used in the GSM cellular communication system.

Before proceeding with the detailed description of the present invention, it may prove helpful to provide an explanation of the prior art with reference to the flowchart shown in FIG. 1 and the results of frame discrimination shown in FIGS. 2A to 2G using computer simulations based on hard decision decoding. According to the GSM digital cellular telecommunications system, convolutional error correction coding is used to distribute transmitted information over time such that it can still be reconstructed, despite some corruption and an error correction decoding technique, such as Viterbi algorithm channel decoding, is used to reconstruct the originally-transmitted information from the corrupted signal. On a downlink path (base-to-mobile), the coded signals are transmitted as a frame sequence with each frame consisting of eight successive bursts of 116 bits each. When a cell-site base station needs to transmit high speed control data, it "steals" part or whole of a traffic channel (TCH) and transmits the control data on the stolen channel which is called a fast associated control channel (FACCH). In a system where a full-rate FACCH frame is used, it is created by stealing whole bits of eight bursts of a frame and setting stealing flag bits hu=1 and hl=1 into the 57th and 58th bit locations of each of these bursts. Whereas, in a system in which a half-rate FACCH frame is used, it is created by stealing all the even numbered bits of a burst and setting flag bits hl=0, hu=1 in the burst, or stealing all the odd numbered bits of a burst and setting flag bits hl=1 and hu=0 in the burst. Due to interleaving at four-burst intervals, the half-rate FACCH frame comprises all the even numbered bits of the second four bursts of a non-interleaved frame and all the odd numbered bits of the first four bursts of a subsequent non-interleaved frame. If the whole of a channel is used to carry traffic, both of the stealing flag bits "hl" and "hu" are set to 0.

The equalization technique currently employed in the GSM system is one that yields a single bit sequence on which hard decisions are made to discriminate between TCH and FACCH frames. As illustrated in FIG. 1, the prior art channel discrimination process at a mobile receiver begins with initialization step 100 which sets the burst number N to 0. At step 101, a burst is received. If the burst number N is 0 (step 102), stealing flag bit count variable FA is set equal to 0 (step 103) and if N=4 (step 104), stealing flag bit count variable FB is set equal to 0 (step 105). If N=0, 1, 2 or 3 (step 106), variable FA is incremented by 1 or 0 depending on the value of stealing flag bit "hu" and variable FB is incremented by 1 or 0 depending on the value of stealing flag bit "hl" (step 107). If N=4, 5, 6 or 7 (step 108), variable FA is incremented by 1 or 0 depending on the value of stealing flag bit "hl" and variable FB is incremented by 1 or 0 depending on the value of stealing flag bit "hu" (step 109). If N is other than 7 or 3 (steps 110, 114), the burst number N is incremented by 1 at step 113 and control returns to step 101 to repeat the process on the next burst.

Accordingly, in a system where the full-rate FACCH frame is employed, the flag variable FA which has been incremented to FA=3 by flag bit "hu" during the first four bursts of the current frame is successively incremented to FA=7 by flag bit "hl" during the second four bursts of the current frame. On the other hand, in a system where the half-rate FACCH frame is used, the flag variable FB which has been incremented by the flag bit "hu" to FB=3 during the second four bursts of a previous frame is successively incremented to FB=7 by the flag bit "hl" during the first fourth bursts of a subsequent frame.

If N=7 (step 110), the variable FA is compared to a fixed threshold value 5 (step 111). If FA≧5, the frame of interest is identified as a FACCH frame (step 112), and if FA<5, it is identified as a TCH frame (step 116). If N is 3 (step 114), then the variable FB is compared to the threshold value 5 (step 115). If FB≧5, the frame of interest is identified as a FACCH frame (step 112), and if FB<5, it is identified as a TCH frame. Following steps 112, 116, variable N is incremented by 1 according to modulo 8 addition. Thus, if N becomes equal to 8, it is set equal to 0.

Since eight bursts exist in each frame, each of the stealing flag bit count values FA and FB of the frame is in the range between 0 and 8, with the 0 corresponding to the worst case in which all the stealing flag bits are corrupted and the 8 corresponding to the most favorable case in which all the stealing bits are correctly received. The threshold value 5 is currently chosen as an optimum value. It will be seen that if the threshold is set at a relatively lower value of the control range, the ratio of frames identified as a fast associated control channel increases, while the ratio of frames identified as a traffic channel decreases. One important factor for the optimum threshold determination is that the ratio of the number of detected FACCH frames to the total number of received frames should be as high as possible and as close as possible to the ratio of the number of detected TCH frames to the total number of received frames. Another important factor is the frame difference value between the number of detected TCH frames and the number of detected FACCH frames. Therefore, the best threshold is one that gives high and equal discrimination ratios for both types of channel and a minimum frame difference value. Accordingly, threshold values must be evaluated using different qualities of transmitted signal and the best threshold is chosen to meet such requirements.

Computer simulations for a total of 1,999 frames under different signal to noise environments (−6 dB to 0 dB) using the hard decision threshold values (1 to 8) show that the best threshold value for each noise environment (white Gaussian noise) is one that provides a minimum of the absolute values of the frame difference value between the number of detected TCH frames and the number of detected FACCH frames as indicated by asterisks. It is shown that the threshold value of 5 is not the best for all S/N ratios. Additionally, it is found that the difference values for the best threshold is not necessarily optimum. They take on substantial values as indicated in FIGS. 2A to 2G, e.g., 162, 115, 73 and 42 for S/N ratios −6 dB, −5 dB, −4 dB and −3 dB, respectively.

Figure 3:
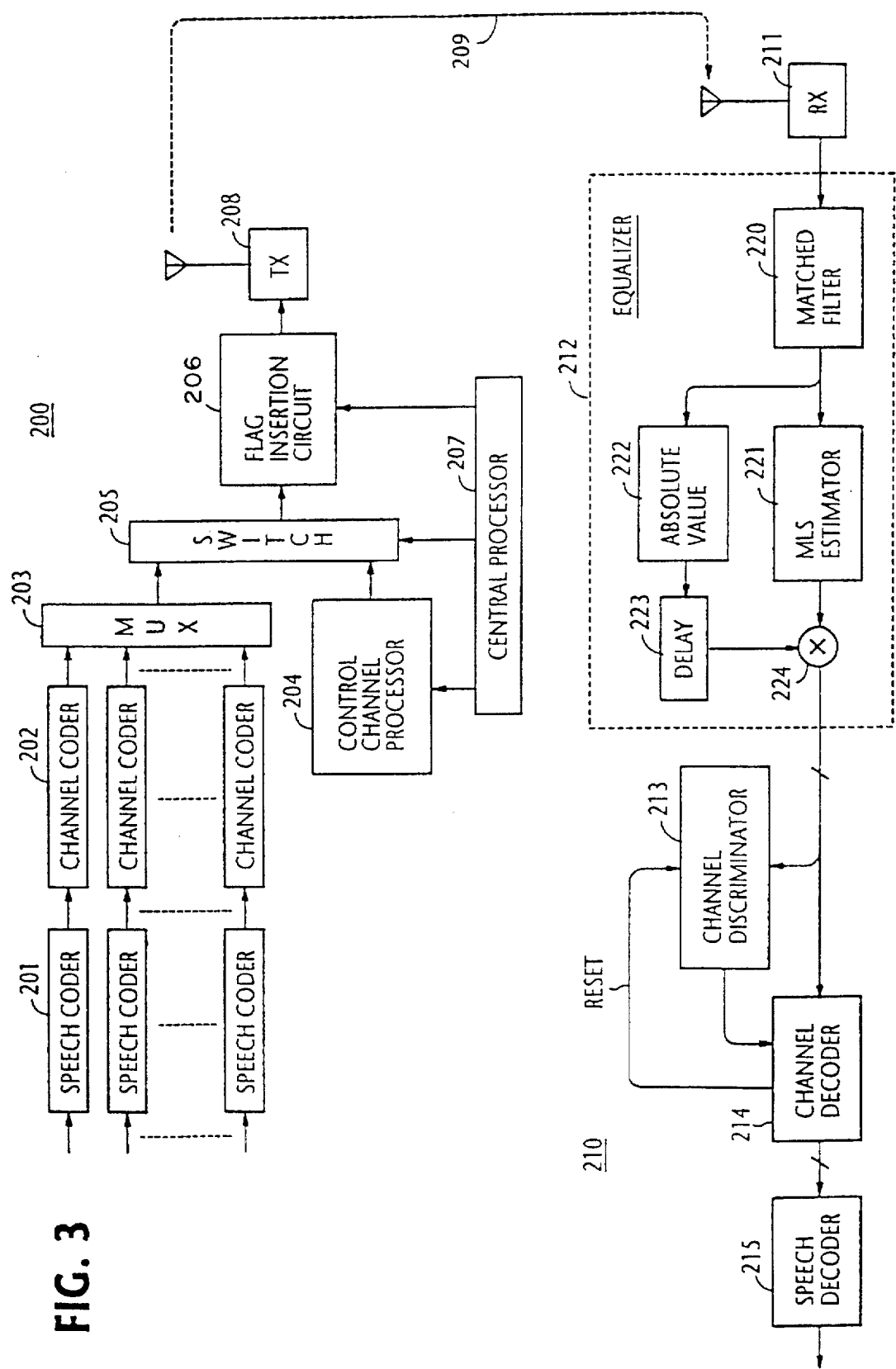
FIG. 3 is a block diagram of a digital cellular communication system in which the present invention is embodied.

Referring now to FIG. 3, there is shown a downlink system of a GSM digital cellular communication system of the present invention. The downlink system comprises a cell-site transmitter 200 and a mobile unit 210. At the cell-site station, the transmission rate of speech signals is converted to a low rate such as 4.8 kbps by known speech coders 201 and then converted in channel coders 202 to convolutional codes using the known convolutional error correction coding technique to distribute transmitted information over time such that it can still be reconstructed, despite some corruption. The code bits of four bursts are organized into a frame are then reordered and interleaved according to the GSM channel coding standard to produce a frame of eight bursts. The eight-burst frame that carries traffic is called the traffic channel. Some of the traffic channel frames are stolen by signaling information and stealing flag bits are inserted into each burst of the stolen frames. These operations are performed by multiplexer 203, control channel processor 204, switch 205, flag insertion circuit 206 and central processor 207. The output of flag insertion circuit 206 is converted to a radio frequency and transmitted from transmitter 208 through a frequency-selective fading channel 209.

The mobile unit 210 includes a receiver 211, an equalizer 212, a channel discriminator 213, a channel decoder 214, and a speech decoder 215. The receiver 211 has radio frequency, intermediate frequency and demodulation stages. Equalizer 212 may be one similar to that disclosed in international patent application published under WO/91/06165. Equalizer 212 comprises a matched filter 220 and a maximum likelihood sequence estimator 221. A radio frequency digital signal exhibiting delay-spread characteristics is received, converted to an intermediate frequency and demodulated into n samples per symbol. The matched filter 220 is matched to the multipath channel characteristics. The MLSE 221 makes one-symbol-at-a-time decisions on the symbol received. The absolute value of the matched filter output is taken by an absolute value converter 222 as a measure of reliability for each of the MLSE's decisions and delayed by a delay element 223 to account for the processing time of the 221. The MLSE's decisions are weighted by a multiplier 224 with the delayed absolute value to provide soft information in which each symbol bit is represented by a three bit code indicating a measure of reliability of the symbol bit, with the most significant bit of the code corresponding to the bit used in the prior art hard decision decoding. Therefore, the stealing flag bits "hl" and "hu" are each represented by a three bit code, on which better channel discrimination can be made in the channel discriminator 213. The equalizer 212 produces a total of 116×3 bits for each burst, which is supplied in the form of three parallel bit sequences #0, #1 and #2 corresponding to the least, medium and most significant binary values, respectively.

Figure 4:
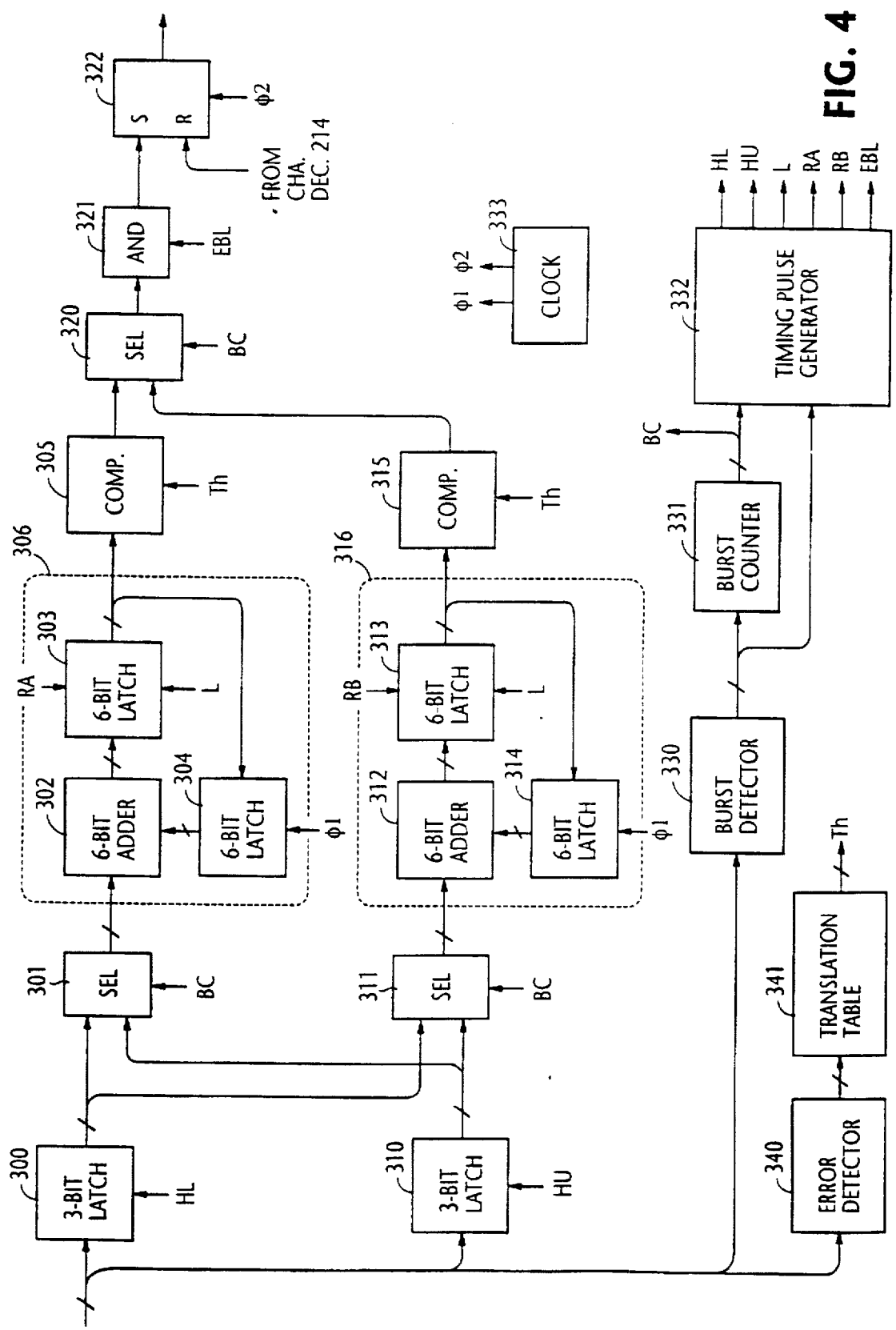
FIG. 4 is a block diagram of the channel discriminator of FIG. 3.
Figure 5A:
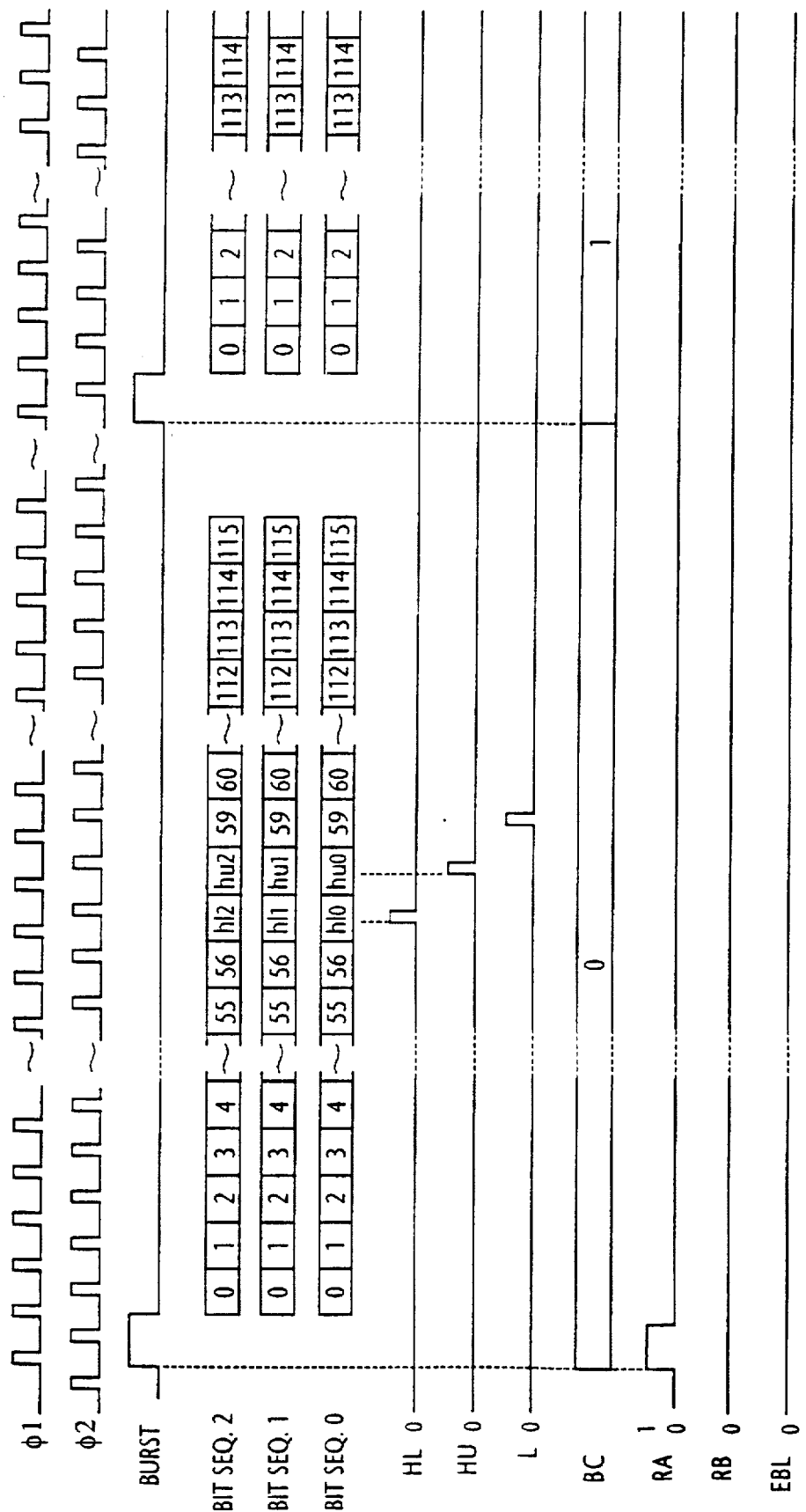
FIGS. 5A to 5C are parts of a timing diagram associated with the block diagram of FIG. 4.
Figure 5B:
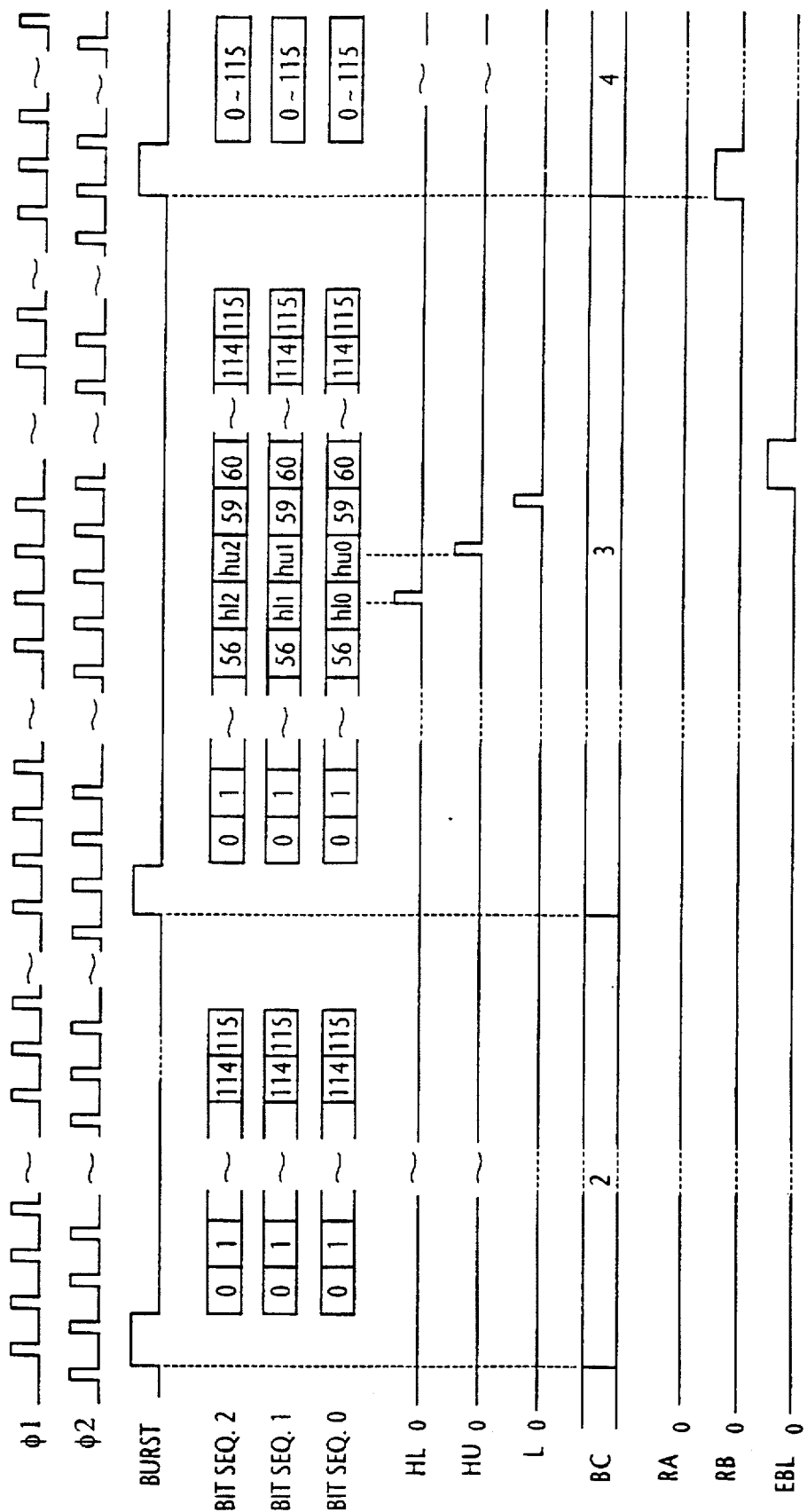
Figure 5C:
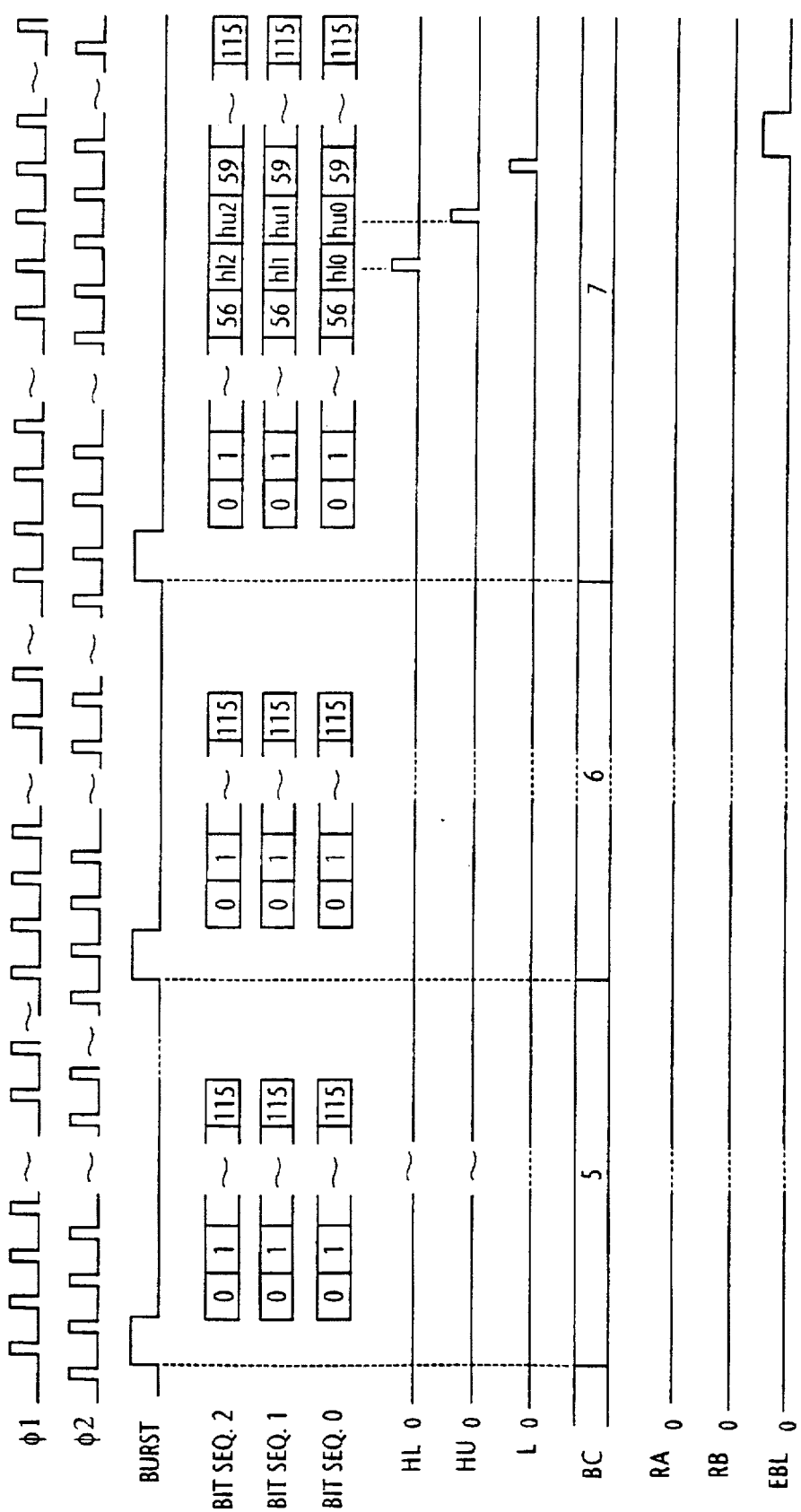

As illustrated in FIG. 4, the channel discriminator 213 of the present invention comprises a burst detector 330 for detecting each burst of downlink frames. A burst counter 331 counts the number of detected bursts and produces a burst count value BC. A timing pulse generator 332 is also responsive to the detected burst for producing various timing signals including latch command pulses HL, HU for latching stealing flags, an add command pulse L, reset pulses RA, RB and an enable pulse EBL. The timing diagram of these pulses is illustrated in FIGS. 5A, 5B and 5C.

An error bit detector 340 is provided for evaluating the equalizer output to detect error bits to produce a signal representative of the signal-to-noise ratio of the received signal. A translation table 341 is connected to the error detector 340 for transforming the S/N ratio to a corresponding 6-bit threshold value Th.

A pair of 3-bit latches 300 and 310 is connected to the equalizer output for extracting stealing flags "hl(k)" and "hu(k)" from the bit sequences #0, #1, #2 in response to the latch command pulses HL and HU, respectively (where k=0, 1, 2 corresponding to the least, medium and most significances, respectively). The output of 3-bit latch 300 is connected to the first inputs of selectors 301 and 311 and the output of 3-bit latch 310 is connected to the second inputs of selectors 301 and 311. As a control signal the burst count value BC is applied to these selectors. Each of these selectors utilizes the burst count BC to select the output of latch 300 if BC=0, 1, 2 or 3, or the output of latch 310 if BC=4, 5, 6 or 7.

A flag counter 306 is responsive to the output of the selector 301. This counter comprises a 6-bit adder 302 and 6-bit latches 303, 304. Latch 303 is reset to zero in response to the reset pulse RA that occurs when BC=0 and activated by the latch command pulse L following the latch pulses HL, HU in order to store a 6-bit sum provided by the adder 302. Latch 304 responds to a clock pulse of phase $\phi 1$ from clock source 333 by latching the output of latch 303 for coupling to adder 302 to be summed with the output of selector 301. The flag counter 306 produces a 6-bit output which represents the total number of stealing flag bits of either hl(k) or hu(k) received in the eight bursts of a frame.

Likewise, a flag counter 316 is provided for counting the output of selector 311, using a 6-bit adder 312 and 6-bit latches 313, 314, which correspond respectively to the adder 302, latches 303, 304, mentioned above. Flag counter 316 differs from flag counter 306 in that latch 313 is reset to zero in response to the reset pulse RB when BC=4. Flag counter 316 produces a 6-bit output representing the total number of stealing flag bits hu(k) received during the second four bursts (BC=4, 5, 6 or 7) of a given frame plus the total number of stealing flag bits hl(k) received during the first four bursts (BC=0, 1, 2, or 3) of a subsequent frame.

The 6-bit output of flag counter 306 is compared to the 6-bit threshold value Th by means of a comparator 305, and the 6-bit output of flag counter 316 is compared to the 6-bit threshold value Th by means of a comparator 315. If the output of each flag counter is equal to or greater than the threshold, each comparator produces a 1 indicating that the current frame is a fast associated control channel, otherwise it produces a 0 indicating that the current frame is a traffic channel.

A selector 320 selects one of the outputs of comparators 305, 315 in accordance with the burst count VC. If BC=0, 1, 2 or 3, the comparator 305 output is selected and applied to an AND gate 321 and if BC=4, 5, 6 or 7, the comparator 315 output is selected for coupling to the AND gate. AND gate 321 is enabled in response to the enable pulse EBL to pass the selector 320 output to the set input of a flip-flop 322 where it is latched by a clock pulse of phase $\phi 2$ for application to the channel decoder 214.

Channel decoder 214 utilizes the output of channel discriminator 213 to initiate a channel decoding process that is particular to each of the incoming frames according to their channel types, and provides a reset pulse to the channel discriminator 213 when the decoding process is complete for a frame. In response to this reset pulse, the flip-flop 322 is initialized.

Figure 6:
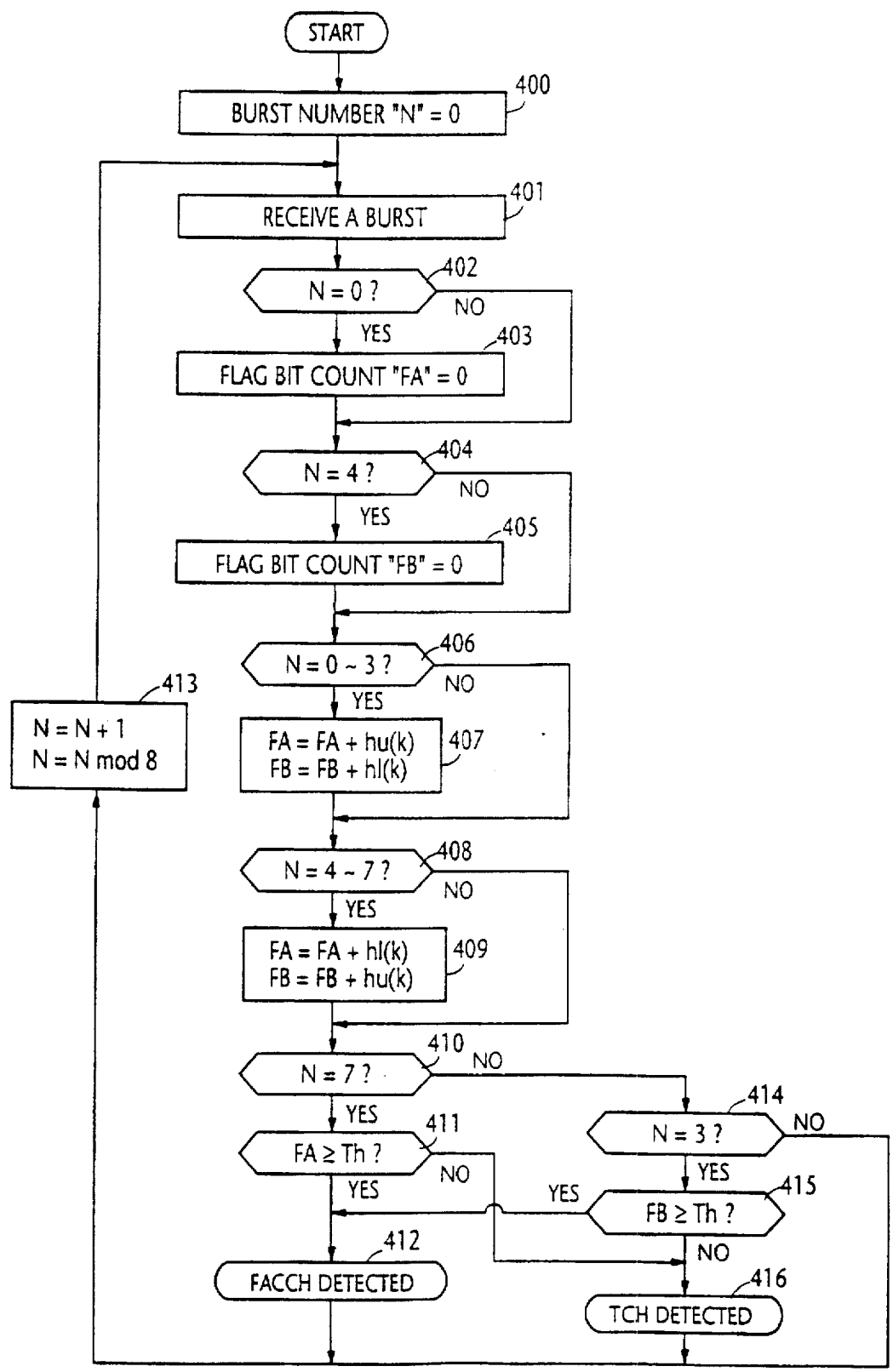
FIG. 6 is a flowchart of the channel discrimination process of the present invention.

The present invention is also implemented by a software program as shown in FIG. 6. The channel discrimination process at a mobile receiver begins with initialization step 400 to set the burst number N to 0. When a burst is received (step 401), the burst number N is checked for equality to 0 (step 402). If N=0, a 6-bit stealing flag bit count variable FA is set equal to 0 (step 403) and if N=4 (step 404), a 6-bit stealing flag bit count variable FB is set equal to 0 (step 405). If N=0, 1, 2 or 3 (step 406), variable FA is incremented by an amount corresponding to the three stealing flag bits hu(0, 1, 2) and variable FB is incremented by an amount corresponding to the three stealing flag bits hl(0, 1, 2) at step 407. If N=4, 5, 6 or 7 (step 408), variable FA is incremented by stealing flag bits hl(0, 1, 2) and variable FB is incremented by stealing flag bits hu(0, 1, 2) at step 409. If N is other than 7 or 3 (steps 41 0, 414), the burst number N is incremented by 1 at step 41 3 and control returns to step 401 to repeat the process on the next burst.

If N=7 (step 410), the variable FA is compared to the 6-bit threshold value Th (step 411). If FA$\geq$Th, the frame of interest is identified as a FACCH frame (step 412), and if FA<Th, it is identified as a TCH frame (step 416). If N is 3 (step 414), then the variable FB is compared to the threshold value Th (step 415). If FB$\geq$Th, the frame of interest is identified as a FACCH frame (step 412), and if FB<Th, it is identified as a TCH frame. Following steps 412, 416, variable N is incremented by 1 according to modulo 8 addition.

Computer simulations were conducted for a total of 1,999 frames under different signal to noise environments (−6 dB to 0 dB) using 6-bit soft decision threshold values in the range between 0 and 56. As indicated in FIGS. 7A to 7G, the simulations show that the best threshold value for each noise environment (white Gaussian noise) provides a minimum of the absolute values of the frame difference value between the number of detected speech channel (TCH) frames and the number of detected FACCH frames as indicated by asterisks. For example, with a threshold value of 28 in an environment of S/N=−6 dB the frame difference value of the present invention is 2 (see FIG. 7A), which favorably compares with the frame difference value is 142 of the prior art hard decision decoding using the threshold value of 4 under the same S/N environment (FIG. 2A). In addition, FIG. 7A shows that the ratios of detected frames for both TCH and FACCH are high and equal to each other. The same tendencies exist for other S/N ratios as is apparent from FIGS. 7B to 7G. For purposes of comparison, the best threshold values of the present invention and the best threshold values of the prior art are summarized in FIG. 8.

Since the threshold value Th is variable as a function of the quality of the received signal, the threshold value is adaptively optimized for a particular level of signal quality.

What is claimed is:

1. A method of channel discrimination between a traffic channel frame and a fast associated control channel frame, comprising the steps of:

a) receiving a signal frame containing a fixed number of delay-dispersed burst signals, each delay-dispersed burst signal containing convolutionally coded information bits and/or convolutionally coded control bits, and at least one non-convolutionally coded stealing flag bit indicating a presence or absence of the control bits, said stealing flag bit occurring between successive blocks of convolutional codes;

b) continuously equalizing delay-dispersal effects of the delay-dispersed burst signals and producing therefrom soft information representing the at least one stealing flag bit of each delay-dispersed burst signal by a multibit value;

c) summing all multibit values of the stealing flag bits of all the delay-dispersed burst signals of the signal frame to produce a count value; and d) comparing said count value to a threshold value to determine that:
1) the signal frame is a fast associated control channel frame if the count value is equal to or greater than the threshold value; and
2) the signal frame is a traffic control frame if the count value is smaller than the threshold value.

2. A method as claimed in claim 1, further comprising:

detecting a signal quality of the signal frame; and varying the threshold value in accordance with the signal quality that was detected.

3. A communication receiver, comprising:

a) means for receiving a signal frame containing a fixed number of delay-dispersed burst signals, each delay-disbursed burst signal containing convolutionally coded information bits and/or convolutionally coded control bits, and at least one non-convolutionally coded stealing flag bit indicating a presence or absence of the control bits and occurring between successive blocks of convolutional codes;

b) means for continuously equalizing delay-dispersal effects of the delay-dispersed burst signals and producing therefrom soft information representing the at least one stealing flag bit of each delay-dispersed burst signal by a multibit value;

c) means for summing all multibit values of all the delay-dispersed burst signals of the signal frame to produce a count value; and d) means for comparing said count value to a threshold value to determine that:
1) the signal frame is a fast associated control channel frame if the count value is equal to or greater than the threshold value; and
2) the signal frame is a traffic channel frame if the count value is smaller than the threshold value.

4. A communication receiver as claimed in claim 3, wherein:

the threshold value is based on a signal quality of the signal frame that was received.

5. A soft decision channel discriminator circuit for a communication receiver which receives a signal frame containing a fixed number of delay-dispersed burst signals, each delay-dispersed burst signal containing convolutionally coded information bits and/or convolutionally coded control bits, and at least one non-convolutionally coded stealing flag bit indicating a presence or absence of the control bits and occurring between successive blocks of convolutional codes, and which continuously equalizes delay-dispersal effects of the delay-dispersed burst signals to produce soft information representing the at least one stealing flag bit of each delay-dispersed burst signal by a multibit value, the soft decision channel discriminator circuit comprising:

a) means for summing all multibit values of all the delay-dispersed burst signals of the signal frame to produce a count value; and b) means for comparing said count value to a threshold value to determine that:
1) the signal frame is a fast associated control channel frame if the count value is equal to or greater than the threshold value; and
2) the signal frame is a traffic channel frame if the count value is smaller than the threshold value.

6. A soft decision channel discriminator circuit for a communication receiver as claimed in claim 5, wherein:

the threshold value is based on a signal quality of the signal frame that was received.

\* \* \* \* \*